United States Patent
Hosokawa et al.

(10) Patent No.: US 7,712,446 B2
(45) Date of Patent: May 11, 2010

(54) CONTROL DEVICE AND METHOD OF CONTROLLING AN INTERNAL COMBUSTION ENGINE

(75) Inventors: Youhei Hosokawa, Susono (JP); Tomohiro Shinagawa, Sunto-gun (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 222 days.

(21) Appl. No.: 12/048,923

(22) Filed: Mar. 14, 2008

(65) Prior Publication Data

US 2008/0228377 A1 Sep. 18, 2008

(30) Foreign Application Priority Data

Mar. 15, 2007 (JP) ............................. 2007-066914

(51) Int. Cl.
*F02D 41/06* (2006.01)
*F02D 41/10* (2006.01)

(52) U.S. Cl. ................................. 123/179.18
(58) Field of Classification Search ............. 123/179.18, 123/179.16, 179.1, 339, 682; 701/103
See application file for complete search history.

(56) References Cited

U.S. PATENT DOCUMENTS

| | | | | |
|---|---|---|---|---|
| 5,826,564 A | * | 10/1998 | Fuwa et al. | 123/491 |
| 5,915,362 A | * | 6/1999 | Fuwa et al. | 123/491 |
| 6,338,331 B1 | * | 1/2002 | Watanabe et al. | 123/399 |

FOREIGN PATENT DOCUMENTS

| | | |
|---|---|---|
| JP | 8-86234 | 4/1996 |
| JP | 8-326584 | 12/1996 |
| JP | 2001-132507 | 5/2001 |
| JP | 2001-159329 | 6/2001 |
| JP | 2003-27972 | 1/2003 |

* cited by examiner

*Primary Examiner*—Mahmoud Gimie
(74) *Attorney, Agent, or Firm*—Oblon, Spivak, McClelland, Maier & Neustadt, L.L.P.

(57) ABSTRACT

A control device of an internal combustion engine includes: a target negative pressure setting section that set a target negative intake pipe pressure during cold acceleration to a negative intake pipe pressure larger than a negative intake pipe pressure prior to the cold acceleration; a throttle valve control section that controls a throttle valve so that the negative intake pipe pressure increases during cold acceleration; and an intake valve control section that controls a variable valve mechanism of an intake valve, based on the target negative intake pipe pressure, to obtain a target intake air amount.

16 Claims, 9 Drawing Sheets

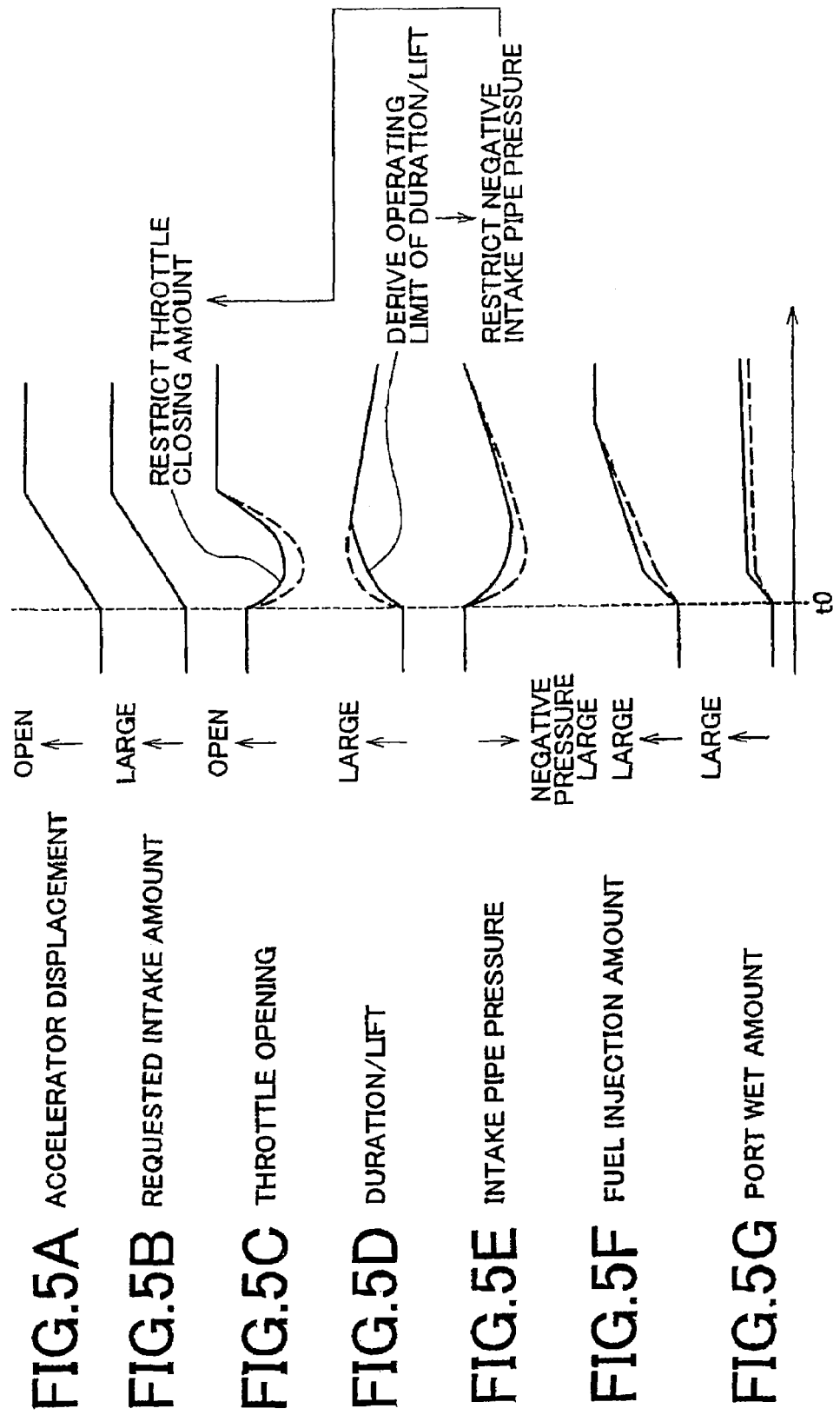

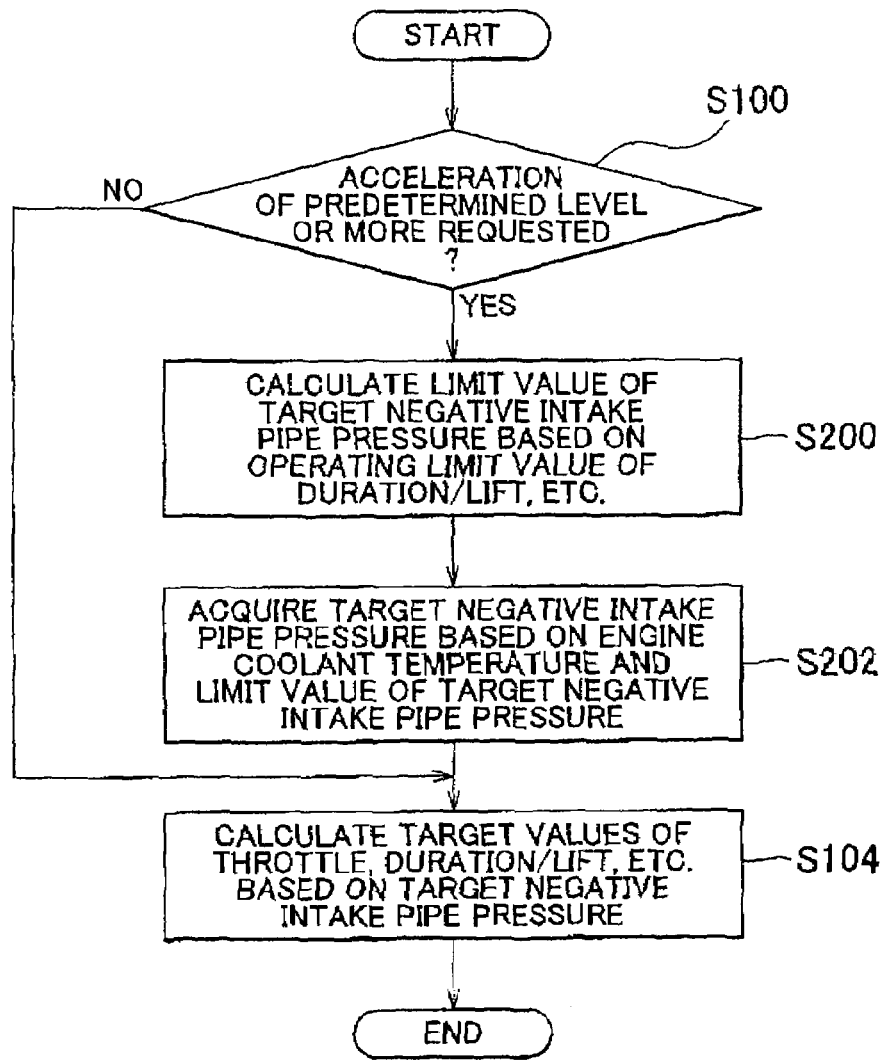
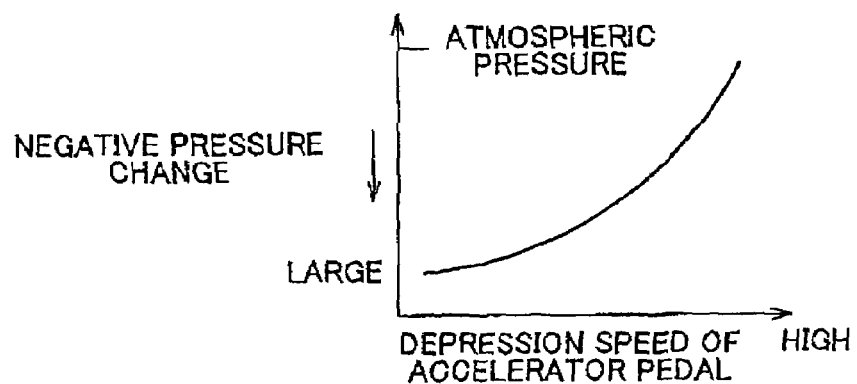

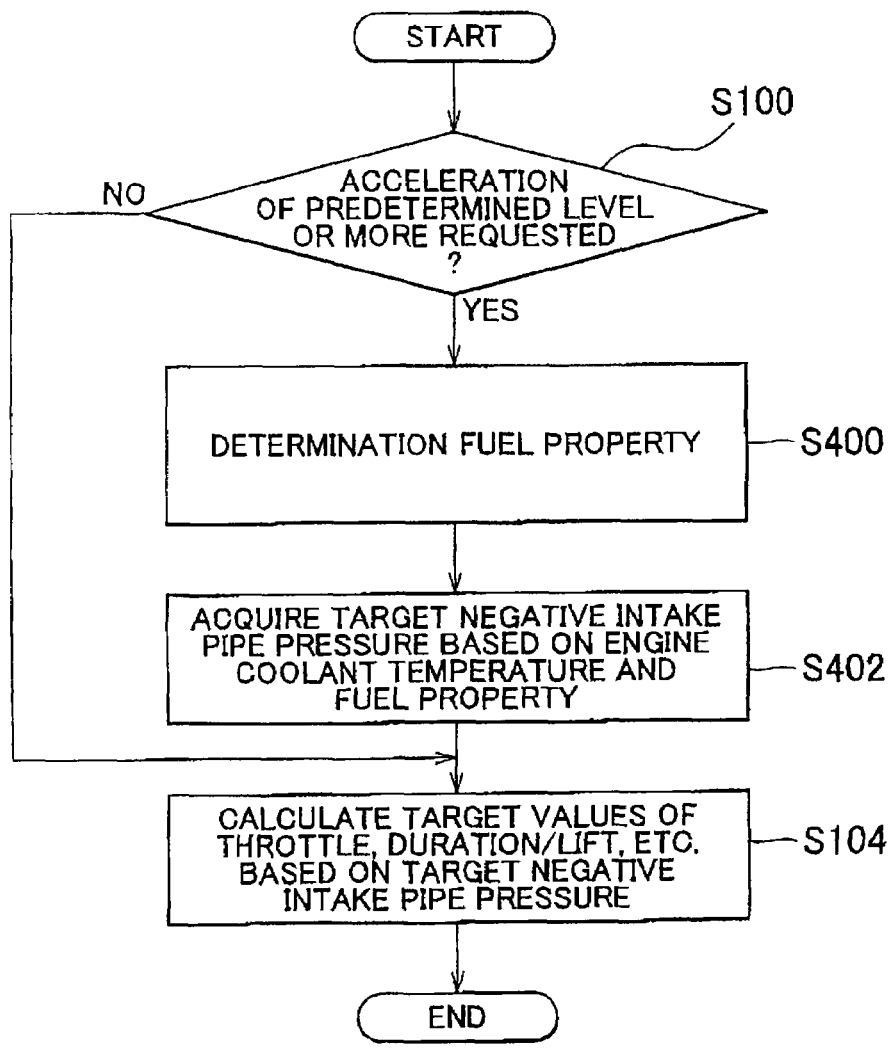
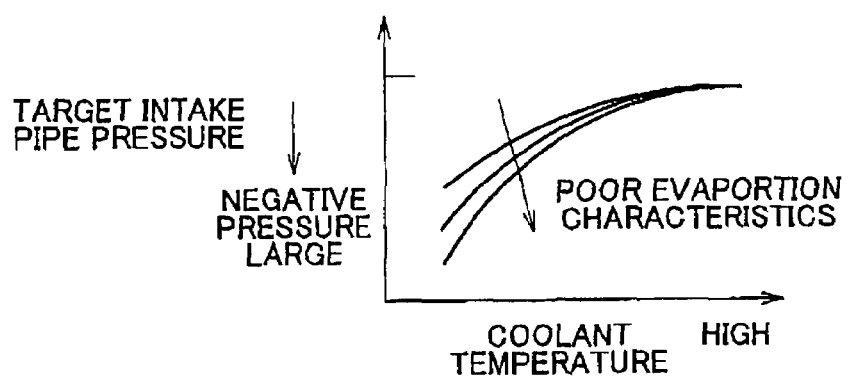

CONTROL DEVICE AND METHOD OF CONTROLLING AN INTERNAL COMBUSTION ENGINE

INCORPORATION BY REFERENCE

The disclosure of Japanese Patent Application No. 2007-66914 filed on Mar. 15, 2007 including the specification, drawings and abstract is incorporated herein by reference in its entirety.

BACKGROUND OF THE INVENTION

1. Field of the Invention

The present invention relates to a control device and method of controlling an internal combustion engine. More specifically, the present invention relates to a control device and method of controlling a port injection type internal combustion engine in which fuel is injected to an intake port.

2. Description of the Related Art

For example, Japanese Patent Application Publication No. 08-86234 (JP-A-08-86234) describes an engine air-fuel ratio control device that calculates a fuel injection amount during cold acceleration of an internal combustion engine, based on the amount of fuel adhering to the port. More specifically, the described control device calculates a fuel shortage amount Hm obtained by subtracting a function value H(tb), that is at acceleration timing tb, from an equilibrium adhesion amount, that is immediately before the acceleration timing. Then, the transient correction amount Kathos is increased by a value corresponding to the shortage amount Hm, thereby preventing the air-fuel ratio from shifting to the lean side when accelerating immediately after a cold start.

However, if an amount of shortage in fuel that has evaporated is compensated for by an increase in fuel injection amount, during cold acceleration, the amount of fuel adhering to the port is further increased. Also, the fuel that adheres to the intake port or the like during acceleration may later be supplied into the cylinder after acceleration. Consequently, when the amount of fuel adhering to the port increases, the air-fuel ratio controllability subsequent to acceleration deteriorates.

SUMMARY OF THE INVENTION

The present invention provides a control device and method of controlling an internal combustion engine that reduces the deterioration of the air-fuel ratio controllability when executing a cold acceleration of the internal combustion engine.

A first aspect of the present invention relates to a control device of an internal combustion engine. The control device includes: a target negative pressure setting section that sets a target negative intake pipe pressure during cold acceleration to a negative intake pipe pressure larger than a negative intake pipe pressure prior to the cold acceleration; a throttle valve control section that controls a throttle valve so that the negative intake pipe pressure increases during cold acceleration; and an intake valve control section that controls a variable valve mechanism of an intake valve, based on the target negative intake pipe pressure, to obtain a target intake air amount.

A second aspect of the present invention relates to a method of controlling an internal combustion engine. The control method includes: setting a target negative intake pipe pressure during cold acceleration to a negative intake pipe pressure larger than a negative intake pipe pressure prior to the cold acceleration; controlling a throttle valve so that the negative intake pipe pressure increases during cold acceleration; and controlling a variable valve mechanism of an intake valve, based on the target negative intake pipe pressure, to obtain a target intake air amount.

In the above-described aspects, the intake pipe pressure is reduced when accelerating the internal combustion engine while cold to increase the evaporation rate of fuel. Because a reduction in port wet amount may thus be expected during cold acceleration, the amount of increase in fuel injection may be reduced, which further reduces the port wet amount. It is thus possible to prevent a deterioration of the air-fuel ratio controllability, that is caused by executing the cold acceleration, after the cold acceleration.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 5A to 5G are diagrams illustrating control according to a second embodiment of the present invention;

FIG. 6 is a flowchart of an operation executed in the second embodiment of the present invention;

FIG. 7 is a diagram showing an example of a negative intake pipe pressure change map that is referenced in the operation shown in FIG. 6;

FIG. 11 is a flowchart of an operation executed in a fourth embodiment of the present invention; and FIG. 12 is a diagram showing an example of a target negative intake pipe pressure map that is referenced in the operation shown in FIG. 11.

DETAILED DESCRIPTION OF THE EMBODIMENTS

Figure 1:
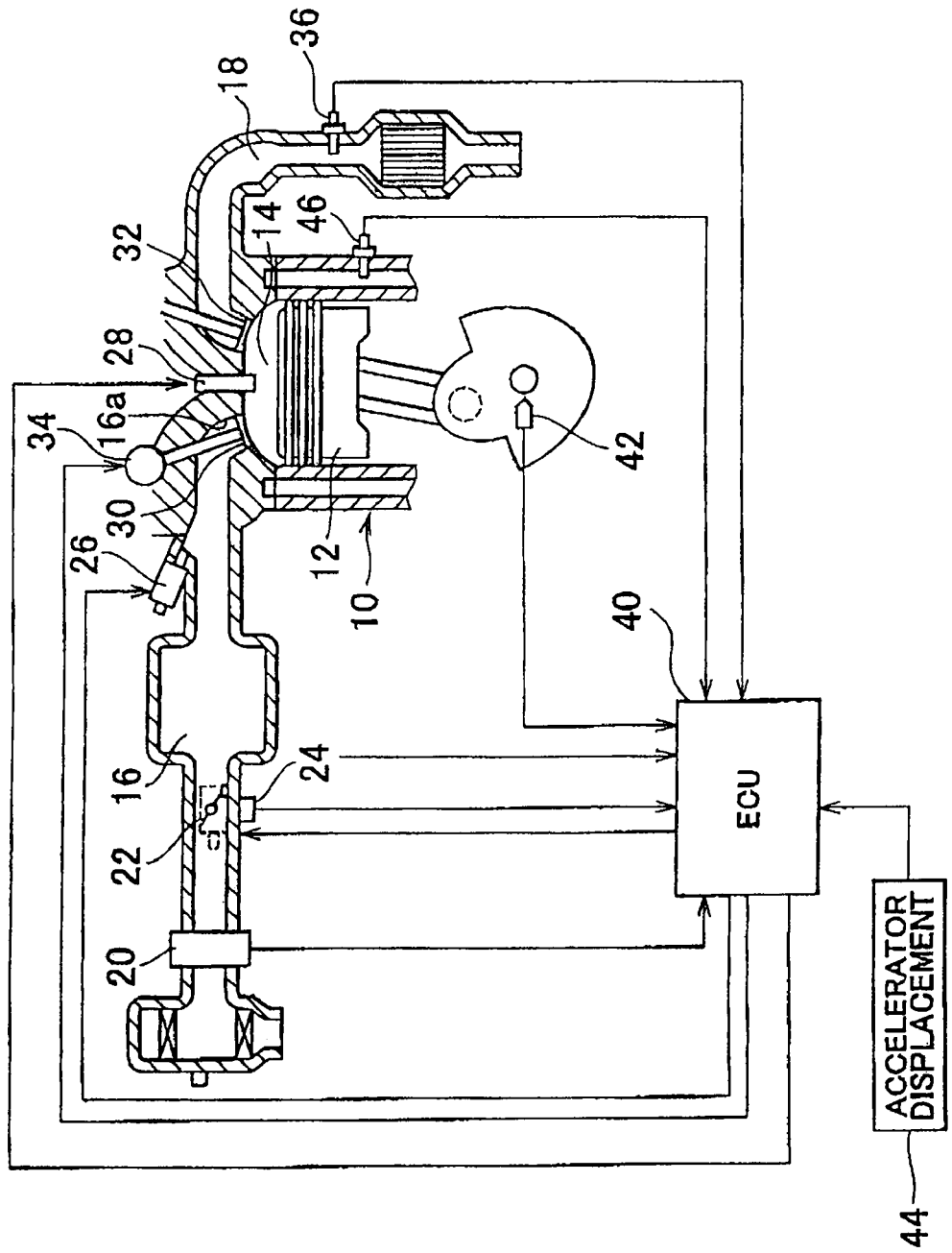
FIG. 1 is a diagram illustrating control according to a first embodiment of the present invention.

FIG. 1 is a diagram showing the configuration of a first embodiment of the present invention. The configuration of the embodiment includes an internal combustion engine 10. A piston 12 is provided inside the cylinder of the internal combustion engine 10. The piston 12 can reciprocate inside the cylinder. Inside the cylinder of the internal combustion engine 10, a combustion chamber 14 is formed on the side of the top portion of the piston 12. Also, an intake passage 16 and an exhaust passage 18 communicate with the combustion chamber 14.

An airflow meter 20 that outputs a signal according to the flow rate of air sucked into the intake passage 16 is provided near the inlet of the intake passage 16. A throttle valve 22 is provided downstream of the airflow meter 20. The throttle valve 22 is an electronically controlled throttle valve whose throttle opening can be controlled independently from the accelerator displacement. Arranged near the throttle valve 22 is a throttle position sensor 24 that detects a throttle opening TA.

A fuel injection valve 26 for injecting fuel into an intake port 16a of the internal combustion engine 10 is provided downstream of the throttle valve 22. An ignition plug 28 is attached for each cylinder to a cylinder head included in the internal combustion engine 10 so as to project into the combustion chamber 14 from the top portion of the combustion chamber 14. An intake valve 30 and an exhaust valve 32 for establishing or cutting off communication between the combustion chamber 14 and the intake passage 16, and between the combustion chamber 14 and the exhaust passage 18, are provided in the intake and exhaust ports respectively.

The intake valve 30 is driven by a variable valve mechanism 34. The variable valve mechanism 34 is a mechanism that can variably control the valve-open characteristics (lift, duration, opening time, closing time, and the like) of the intake valve 30. An air-fuel ratio sensor 36 is provided in the exhaust passage 18 for detecting the exhaust air-fuel ratio.

The configuration shown in FIG. 1 includes an electronic control unit (ECU) 40. In addition to the various sensors described above, a crank angle sensor 42 for detecting the engine speed, an accelerator position sensor 44 for detecting the accelerator displacement, and a coolant temperature sensor 46 for detecting the engine coolant temperature are connected to the ECU 40. Also, various actuators for driving the above-described throttle valve 22, the variable valve mechanism 34, and the like are connected to the ECU 40. Based on the output of each sensor, the ECU 40 drives each actuator in accordance with a predetermined program, thereby controlling the operational state of the internal combustion engine 10.

According to the internal combustion engine 10 including the variable valve mechanism 34 described above, by controlling the lift and the duration of the intake valve 30 while the throttle opening TA is sufficiently large (hereinafter, for the convenience of description, this control is referred to as "control A"), it possible to control an intake air amount Ga without reducing the intake pipe pressure significantly, that is, reducing the pump loss.

The amount of fuel adhering to the wall surface or the like of the intake port 16a (port wet amount) increases as the wall surface or the like of the intake port 16a becomes cooler. Accordingly, when the internal combustion engine 10 is cold, it is necessary to increase the fuel injection amount by taking into account a decrease in the amount of fuel injected into the cylinder due to port wet. Further, the evaporation rate of fuel is also determined by the saturation vapor pressure of fuel and the ambient pressure (the intake pipe pressure when referring to the interior of the intake port 16a). More specifically, the lower the intake pipe pressure, the higher the evaporation rate of fuel.

Accordingly, because formation of a negative intake pipe pressure is suppressed under the condition in which the above-mentioned control A using the variable valve mechanism 34 is executed, the evaporation rate of fuel decreases. As a result, if the above-mentioned control A is executed during acceleration while the internal combustion engine 10 is cold, the increase in fuel injection amount required to compensate for the shortage in the evaporation amount of fuel increases, and the amount of fuel adhering to the intake port 16a or the like also increases. The amount of fuel that adheres to the intake port 16a or the like during acceleration may later be supplied into the combustion chamber 14 after acceleration. Therefore, an increase in port wet amount leads to deterioration of the air-fuel ratio controllability after the acceleration.

Accordingly, in this embodiment, as shown in FIGS. 2A to 2G, when an acceleration request is made while the engine is cold, in which the above-mentioned control A using the variable valve mechanism 34 is executed, the throttle valve 22 is closed to increase the negative intake pipe pressure, thereby promoting evaporation of fuel. At the same time, the intake air amount Ga at the cold acceleration is controlled to a requested intake air amount by regulating the lift and the duration of the intake valve 30.

Figure 2:
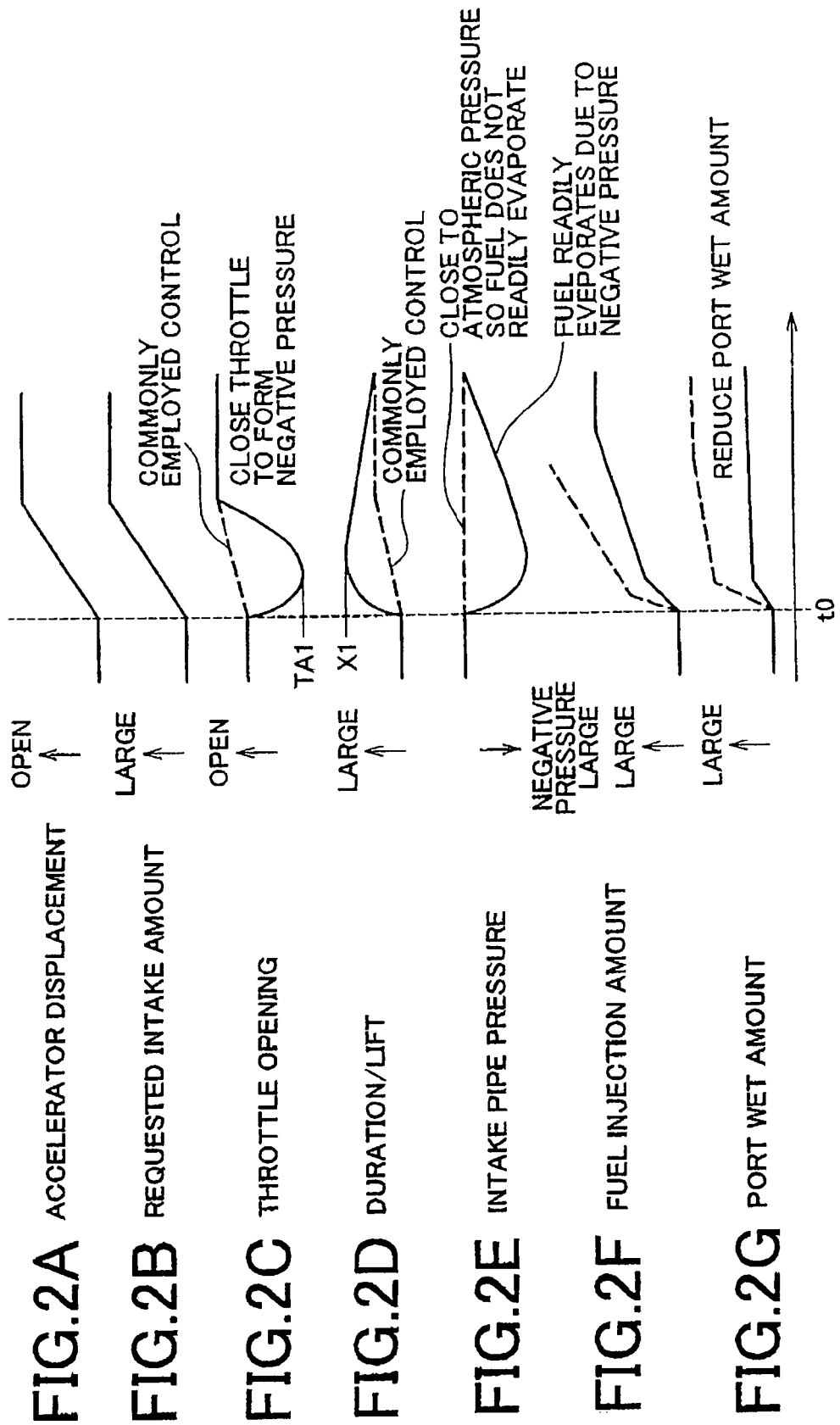
FIGS. 2A to 2G are diagrams illustrating control according to the first embodiment of the present invention.

FIGS. 2A to 2G are diagrams illustrating control according to this embodiment. In FIGS. 2C to 2G, each broken line indicates the execution of a commonly employed control. In the example shown in FIGS. 2A to 2G, the above-mentioned control A is performed when the internal combustion engine 10 is cold. Therefore, as shown in FIGS. 2C and 2D, before the acceleration request (t0), the throttle valve 22 is opened relatively wide, and the duration and the lift of the intake valve 30 are controlled to be relatively small.

As shown in FIGS. 2A and 2B, when the requested intake amount increases after the depression of an accelerator pedal during acceleration, according to the commonly employed control, as indicated by the broken lines in FIGS. 2C and 2D, the throttle valve 22 is widely opened, and the duration and the lift of the intake valve 30 are increased. Accordingly, as indicated by the broken line in FIG. 2E, the intake pipe pressure hovers around a value close to the atmospheric pressure, so fuel does not readily evaporate. Also, during acceleration, as indicated by the broken line in FIG. 2F, the fuel injection amount is increased accompanying an amount of increase that takes the port wet amount into account as indicated by the broken line in FIG. 2G. In this case, the port wet amount itself increases as the amount of fuel injection increases.

In contrast, according to this embodiment, when the requested intake amount increases after the depression of the accelerator pedal, as indicated by the solid line in FIG. 2C, the opening amount of the throttle valve 22 is reduced to a predetermined opening amount TA1 that is smaller than the throttle opening amount TA immediately before the acceleration request. Thus, as indicated by the solid line in FIG. 2E, this sharply reduces the intake pipe pressure, thereby promoting evaporation of fuel. The amount by which the opening amount of the throttle valve 22 is reduced is determined such that a target negative intake pipe pressure defined in relation to the engine coolant temperature, as will be described later, is attained.

Also, in this embodiment, as indicated by the solid line in FIG. 2D, the duration and the lift of the intake valve 30 are each regulated to be a control amount X1, in order to compensate for a decrease in the intake air amount Ga following the reduction of the intake pipe pressure due to the above-mentioned closing of the throttle valve 22 by increasing the duration and the lift of the intake valve 30.

According to the above-described control of this embodiment, during cold acceleration, the throttle valve 22 is controlled to form a negative intake pipe pressure, thereby making it possible to increase the evaporation rate of fuel. Therefore, as indicated by the solid line in FIG. 2G, the port wet amount is reduced. Further, as indicated by the solid line in FIG. 2F, the increase in fuel injection amount is restrained by the reduction in port wet amount. The decrease in the intake air amount Ga after the intake pipe pressure is reduced may be compensated for by regulating the duration and the lift of the intake valve 30.

Figure 3:
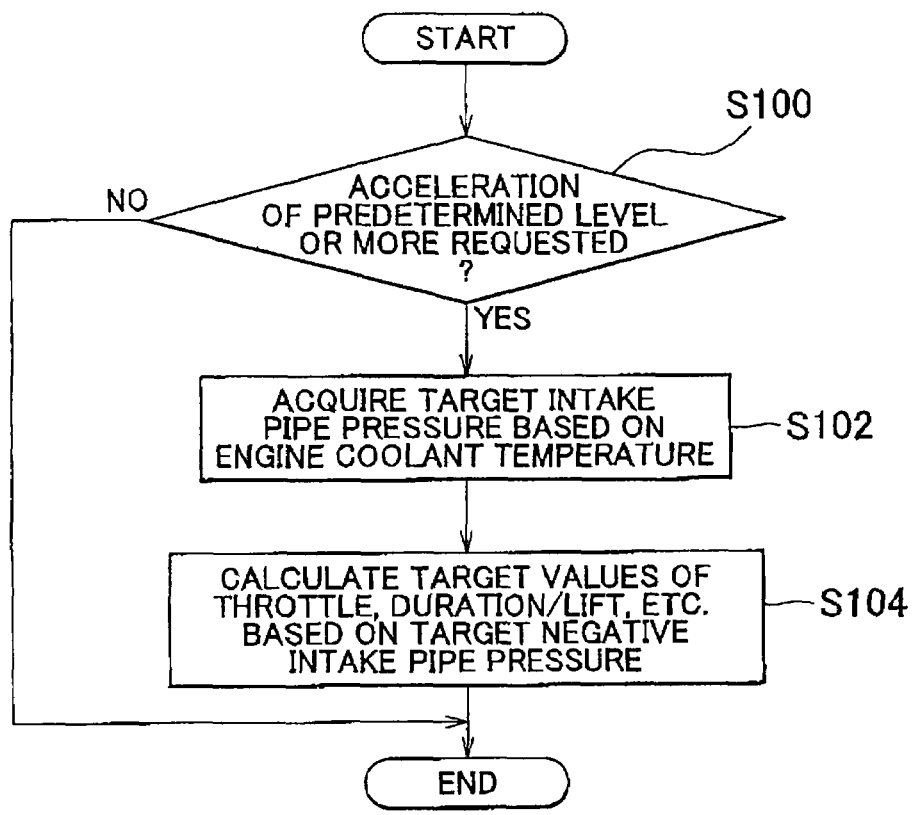
FIG. 3 is a flowchart of an operation executed in the first embodiment of the present invention.

FIG. 3 is a flowchart of an operation that is executed by the ECU 40 in this embodiment to realize the above-mentioned control.

First, the ECU 40 determines whether an acceleration request of a predetermined level or more (step 100) has been made based on the output of the accelerator position sensor 44.

If the ECU 40 determines that an acceleration request of a predetermined level or more has been made, the ECU 40 acquires a target negative intake pipe pressure based on the engine coolant temperature (step 102).

Figure 4:
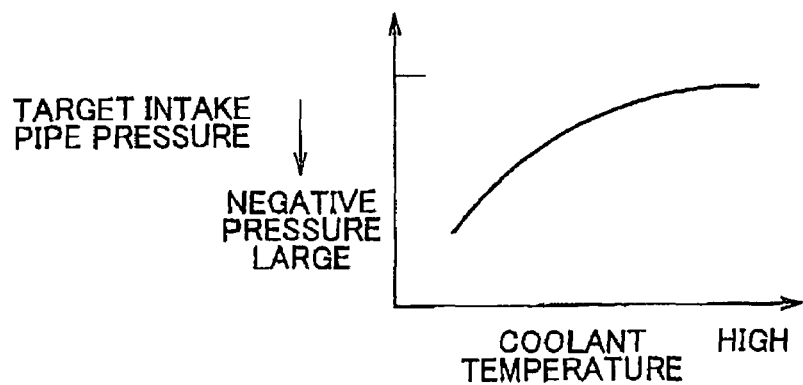
FIG. 4 is a diagram showing an example of a target negative intake pipe pressure map that is referenced in the operation shown in FIG. 3.

As shown in FIG. 4, the ECU 40 stores a map that defines the relationship between the engine coolant temperature and the target negative intake pipe pressure. As the engine coolant temperature increases, that is, as the internal combustion engine 10 is warmed up, the temperature of the wall surface or the like of the intake port 16a also increases. As the temperature of the wall surface or the like of the intake port 16a increases, the port wet amount decreases. Also, as described above, as the negative intake pipe pressure increases, the port wet amount decreases because the evaporation rate of fuel increases. In the map shown in FIG. 4, the target negative intake pipe pressure is set so that the target negative intake pipe pressure is reduced (becomes closer to the atmospheric pressure) as the engine coolant temperature increases. According to this setting of the map, an appropriate target negative intake pipe pressure for reducing the port wet amount may be obtained based on the engine coolant temperature, regardless of the progress of the warm-up of the internal combustion engine 10.

Next, the ECU 40 calculates the closing amount of the throttle valve 22 based on the target negative intake pipe pressure acquired in step 102. Based on the above calculated closing amount of the throttle valve 22 and the detected requested level of acceleration, the ECU 40 calculates the respective target values of the duration and the lift of the intake valve 30 (step 104).

In the ECU 40, the relationship between the intake pipe pressure and the throttle opening TA is stored, and also the duration and the lift of the intake valve 30 required for attaining a requested intake amount according to the throttle opening TA and requested acceleration level are stored in relation to the intake pipe pressure. That is, in step 104, the closing amount of the throttle valve 22 to obtain the target negative intake pipe pressure, and the duration and the lift of the intake valve 30 required to provide the requested intake amount under the negative intake pipe pressure controlled by the closing of the throttle valve 22 are calculated.

Then, although not illustrated in the operation shown in FIG. 3, in the subsequent step, the ECU 40 controls the throttle valve 22, and the duration and the lift of the intake valve 30 based on the calculated respective target values of the closing amount of the throttle valve 22, and of the duration and the lift of the intake valve 30.

According to the operation shown in FIG. 3 described above, when there is an acceleration request of a predetermined level or more, an appropriate target negative intake pipe pressure according to the engine coolant temperature is obtained, in which the target negative intake pipe pressure is lower than the intake pipe pressure immediately before acceleration, and based on this target negative intake pipe pressure, the target value of the throttle valve 22 and the target values of the duration and the lift of the intake valve 30 during acceleration are obtained. As a result, the throttle valve 22 is controlled so that the target negative intake pipe pressure is obtained, and the duration and the lift of the intake valve 30 are controlled so that a target intake air amount is obtained under conditions where the intake pipe pressure is controlled to the target negative intake pipe pressure.

As a result, if acceleration is requested while the internal combustion engine 10 is cold, the intake pipe pressure is significantly reduced, thereby increasing the evaporation rate of fuel. Therefore, during cold acceleration, the port wet amount is reduced, thereby making it possible to reduce the increase in the fuel injection amount. Further, such a reduction in the amount of increase in fuel injection leads to a further reduction in port wet amount. It is thus possible to improve the air-fuel ratio controllability subsequent to cold acceleration.

Further, because the target negative intake pipe pressure during cold acceleration is set to an appropriate value according to the engine coolant temperature, the air-fuel ratio controllability subsequent to cold acceleration is improved, and also an operation that reduces pump loss, that is, a reduction in fuel consumption by the above-mentioned control A, may be executed as much as possible.

It should be noted that in the first embodiment described above, the ECU 40 that acquires the target negative intake pipe pressure based on the engine coolant temperature in step 102 may be regarded as a "target negative pressure setting section" of the present invention. In addition, the ECU 40 that controls the opening of the throttle valve 22 based on the target value calculated in the process of step 104 may be regarded as a "throttle valve control section" of the present invention. The ECU 40 that controls the duration and the lift of the intake valve 30 based on the target value calculated in the process of step 104 may be regarded as the "intake valve control section" of the present invention.

Next, a second embodiment of the present invention will be described with reference to FIGS. 5A to 8. In this embodiment, the configuration shown in FIG. 1 is employed, and the ECU 40 executes the operation shown in FIG. 6, described later, instead of the operation shown in FIG. 3.

In this embodiment as well, basically in the same manner as in the first embodiment described above, the ECU 40 closes the throttle valve 22 during cold acceleration to generate a negative intake pipe pressure according to the engine coolant temperature, and also controls the duration and the lift of the intake valve 30 so that the intake air amount Ga becomes the requested intake amount.

However, if cold acceleration is sudden, the requested intake amount changes abruptly. In that case, there may be times when the requested intake amount cannot be provided due to restriction on the operating speed of the variable valve mechanism 34, that is the actuator that varies the duration and the lift of the intake valve 30.

Accordingly, in this embodiment, the limit value of a target negative intake pipe pressure during cold acceleration is derived based on the limit value of the operating speed of the duration and the lift of the intake valve 30 by the variable valve mechanism 34, and a negative intake pipe pressure is formed within a range of values that allow a requested intake amount to be provided by the variable valve mechanism 34. Below, a more detailed description will be given in this regard with reference to FIGS. 5A to 5G.

FIGS. 5A to 5G are diagrams illustrating control according to the second embodiment. The broken line in FIG. 5D indicates a change in the duration and the lift of the intake valve 30 required when an intake air amount Ga that exceeds the operating limit of the variable valve mechanism 34 is requested during cold acceleration. On the other hand, the solid line in FIG. 5D indicates a change in the duration and the lift of the intake valve 30 when the variable valve mechanism 34 is at its operating limit.

In this embodiment, in view of such restriction on the operating speed of the variable valve mechanism 34, as indicated by the solid line in FIG. 5E, a restriction is placed on how much the intake pipe pressure may be reduced. To ensure that such restriction on the negative intake pipe pressure is reflected, the closing amount of the throttle valve 22 is restricted as indicated by the solid line in FIG. 5C.

FIG. 6 is a flowchart of an operation executed by the ECU 40 in this embodiment in order to realize the above-mentioned function. It should be noted that in FIG. 6, the steps that are the same as those shown in FIG. 3 in the first embodiment are denoted by the same symbols and description thereof is omitted or simplified.

In the operation shown in FIG. 6, if the ECU 40 determines in step 100 that there is an acceleration request of a predetermined level or more, the ECU 40 acquires the limit value of a target negative intake pipe pressure based on the limit value of the operating speed of the variable valve mechanism 34 (step 200). As shown in FIG. 7, the ECU 40 stores a map that defines the relationship between the accelerator pedal depression speed and the change in negative intake pipe pressure during acceleration. In the map shown in FIG. 7, based on the operating limit of the variable valve mechanism 34, the target negative intake pipe pressure is set so that as the depression speed increases (that is, as the requested acceleration increases), the change in negative intake pipe pressure relative to that before acceleration decreases (that is, a greater restriction is placed on the formation of a negative intake pipe pressure). In this step 200, the ECU 40 acquires the limit value of a target negative intake pipe pressure by referencing the map stored in the ECU 40.

Figure 8:
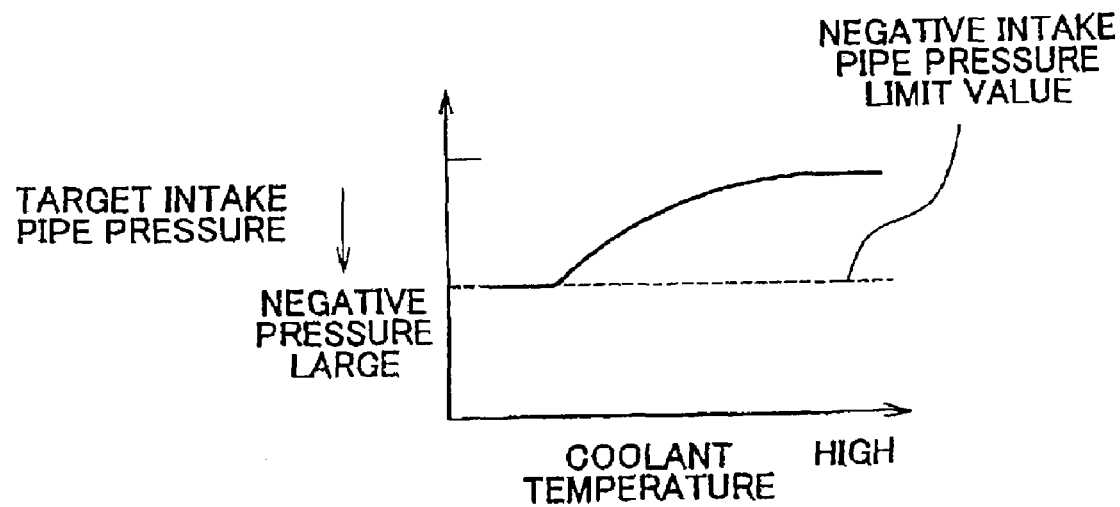
FIG. 8 is a diagram showing an example of a target negative intake pipe pressure map that is referenced in the operation shown in FIG. 6.

Next, as shown in FIG. 8, the ECU 40 acquires a target negative intake pipe pressure based on the engine coolant temperature, according to the limit value of a target negative intake pipe pressure acquired in step 200 (step 202). In this step 202, referring to a map shown in FIG. 8, which is set to have a similar characteristic as the map shown in FIG. 4, the ECU 40 acquires the target negative intake pipe pressure within the range of restriction as imposed by the limit value of a target negative intake pipe pressure.

Next, based on the target negative intake pipe pressure acquired in step 202, the ECU 40 calculates the respective target values of the closing amount of the throttle valve 22 and of the duration and the lift of the intake valve 30 (step 104).

Then, although not illustrated in the operation shown in FIG. 6, in the subsequent step, the ECU 40 controls the throttle valve 22, and the duration and the lift of the intake valve 30 on the basis of the calculated respective target values of the closing amount of the throttle valve 22, and of the duration and the lift of the intake valve 30.

According to the operation shown in FIG. 6 described above, the negative intake pipe pressure to be formed during acceleration is restricted based on the operating limit of the variable vale mechanism 34, thereby making it possible to reduce the port wet amount and provide the requested intake amount during cold acceleration.

Next, a third embodiment of the present invention will be described with reference to FIGS. 9A to 9G and FIG. 10. In this embodiment, the configuration shown in FIG. 1 is employed, and the ECU 40 executed the operation shown in FIG. 10, described later, instead of the operation shown in FIG. 3.

In this embodiment as well, basically in the same manner as in the first embodiment described above, the ECU 40 closes the throttle valve 22 during cold acceleration to produce a negative intake pipe pressure according to the engine coolant temperature, and also controls the duration and the lift of the intake valve 30 so that the intake air amount Ga becomes the requested intake amount.

However, when the level of a requested negative intake pipe pressure to be produced by closing the throttle valve 22 during cold acceleration is high, there may be times when the requested negative intake pipe pressure cannot be provided due to the restriction on the operating speed of the throttle valve 22, so an intake amount supplied into the cylinder may exceed the requested intake amount as a result.

Accordingly, in this embodiment, the limit value of a target negative intake pipe pressure during cold acceleration is derived on the basis of the limit value of the operating speed at the time of closing operation of the throttle valve 22. Then, by controlling the variable valve mechanism 34 in accordance with the negative intake pipe pressure that is restricted by the limit value of the operating speed at the closing operation of the throttle valve 22, the intake air amount Ga is controlled to be the requested intake amount.

FIGS. 9A to 9G are diagrams illustrating control according to the third embodiment. The broken line in FIG. 9C indicates a change in the opening of the throttle valve 22 required when an intake air amount Ga that exceeds the operating limit of the variable valve mechanism 34 is requested during cold acceleration. On the other hand, the solid line in FIG. 9C indicates a change in the opening amount when the throttle valve 22 is at its operating limit.

Figure 9:
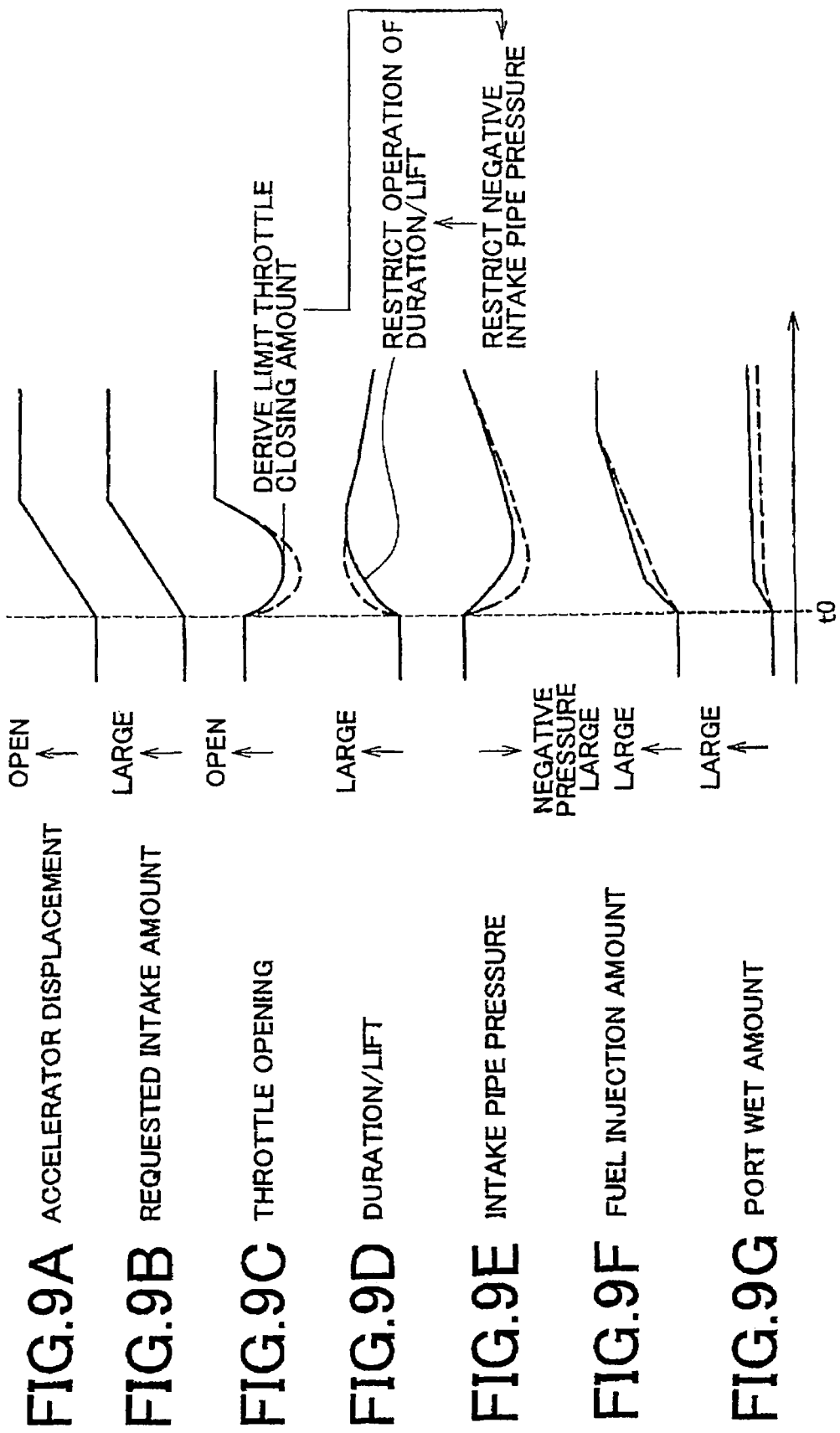
FIGS. 9A to 9G are diagrams illustrating control according to a third embodiment of the present invention.

In this embodiment, in view of such restriction on the operating speed of the throttle valve 22, as indicated by the solid line in FIG. 9E, a restriction is placed on how much the intake pipe pressure may be lowered. To ensure that a requested intake amount is attained in accordance with such restriction on the negative intake pipe pressure, the duration and the lift of the intake valve 30 are controlled by the variable valve mechanism 34 as indicated by the solid line in FIG. 9D.

Figure 10:
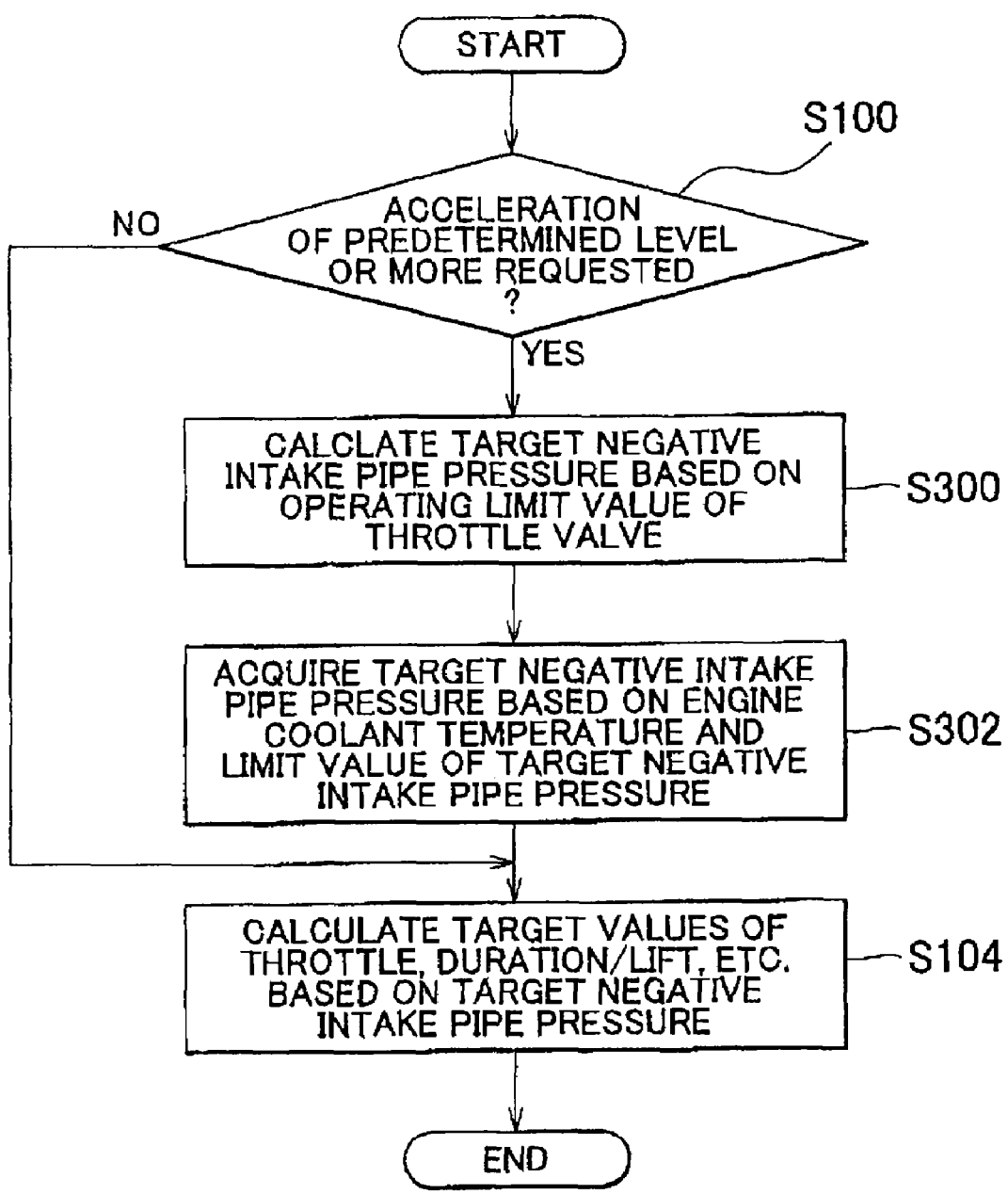
FIG. 10 is a flowchart of an operation executed in the third embodiment of the present invention.

FIG. 10 is a flowchart of an operation executed by the ECU 40 to realize the above-described function. It should be noted that in FIG. 10, the steps that are the same as those shown in FIG. 3 are denoted by the same symbols and description thereof is omitted or simplified.

In the operation shown in FIG. 10, if the ECU 40 determines in step 100 that there is an acceleration request of a predetermined level or more, the ECU 40 acquires the limit value of a target negative intake pipe pressure based on the limit value of the operating speed of the throttle valve 22 when closing the throttle valve 22 (step 300). The ECU 40 stores a map (a map similar to the map shown in FIG. 7) that defines the relationship between the accelerator pedal depression speed and the change in negative intake pipe pressure during acceleration. In step 300, the ECU 40 acquires the limit value of a target negative intake pipe pressure by referring to this map.

Next, the ECU 40 acquires a target negative intake pipe pressure based on the engine coolant temperature, according to the limit value of a target negative intake pipe pressure acquired in step 300 (step 302). In this step 302, the ECU 40 acquires a target negative intake pipe pressure by referencing a map similar to the map shown in FIG. 8.

Next, based on the target negative intake pipe pressure acquired in step 302, the ECU 40 calculates the respective target values of the closing amount of the throttle valve 22 and of the duration and the lift of the intake valve 30 (step 104).

Then, although not illustrated in the operation shown in FIG. 10, in the subsequent step, the ECU 40 controls the throttle valve 22, and the duration and the lift of the intake valve 30 in accordance with the calculated respective target values of the closing amount of the throttle valve 22, and of the duration and the lift of the intake valve 30.

According to the operation shown in FIG. 10 described above, the duration and the lift of the intake valve 30 during cold acceleration are controlled by the variable valve mechanism 34 so that the intake air amount Ga according to a negative intake pipe pressure that is restricted in relation to the operating limit of the throttle valve 22 is obtained. Therefore, it is possible to reduce the port wet amount and provide the requested intake amount during cold acceleration.

Next, a fourth embodiment of the present invention will be described with reference to FIGS. 11 and 12. In this embodiment, the configuration shown in FIG. 1 is employed, and an operation shown in FIG. 11, described later, is executed by the ECU 40 instead of the operation shown in FIG. 3.

This embodiment has a configuration in which a plurality of fuel types, for example, gasoline and ethanol, are supplied, and the internal combustion engine 10 may be operated by using any one of these fuel types (a system mounted in a vehicle that is a so-called flexible-fuel vehicle (FFV)). In this configuration, the fuel that is ultimately supplied to the internal combustion engine 10 varies depending on such factors as the fuel type selected by the user of the vehicle, the amount added during refueling, and the amount of fuel that remains within the fuel tank at that time.

The evaporation characteristics of fuel vary depends on the property of the fuel. More specifically, when a fuel with poor evaporation characteristics such as ethanol is used, when accelerating during cold, the amount of fuel injected needs to be greatly increased, which also leads to an increase in port wet amount. Also, because a fuel with poor evaporation characteristics has a low evaporation rate, the evaporation amount of fuel from the intake port 16a or the like is not sufficient relative to the increase in the intake air amount Ga during acceleration. As a result, the air-fuel ratio during acceleration becomes lean, which may cause misfire.

Therefore, when a fuel with poor evaporation characteristics is used, it is desirable to sharply lower the intake pipe pressure during cold acceleration. However, when a fuel with good evaporation characteristics is used, application of an excessive negative intake pipe pressure increases pump loss, which may cause deterioration of fuel economy. Accordingly, in this embodiment, the target negative intake pipe pressure during cold acceleration varies depending on fuel property.

FIG. 11 is a flowchart of an operation executed by the ECU 40 in this embodiment in order to implement the above-described function. It should be noted that in FIG. 11, the steps that are the same as those shown in FIG. 3 are denoted by the same symbols and description thereof is omitted or simplified.

In the operation shown in FIG. 11, if the ECU 40 determines in step 100 that there is an acceleration request of a predetermined level or more, the ECU 40 then determines the properties of the fuel supplied to the internal combustion engine 10 (step 400). Because the theoretical air-fuel ratio varies depending on the fuel, the air-fuel ratio changes sharply upon switching the fuel supplied to the internal combustion engine 10. Such a change in air-fuel ratio manifests itself as a change in the amount of feedback correction to the fuel injection amount in the air-fuel ratio feedback control executed by the ECU 40. In this step 400, the ECU 40 performs the fuel property determination based on the air-fuel ratio feedback correction amount.

Next, the ECU 40 acquires a target negative intake pipe pressure based on the engine coolant temperature and fuel property (step 402). As shown in FIG. 12, the ECU 40 stores a map that defines the relationship between the engine coolant temperature, the fuel property, and the target negative intake pipe pressure. In the map shown in FIG. 12, the target negative intake pipe pressure is set so that the target negative intake pipe pressure increases (the pressure decreases) as the evaporation characteristics of fuel become poorer.

Next, based on the target negative intake pipe pressure acquired in step 402, the ECU 40 calculates the respective target values of the closing amount of the throttle valve 22 and of the duration and the lift of the intake valve 30 (step 104).

Then, although not illustrated in the operation shown in FIG. 11, in the subsequent step, the ECU 40 controls the throttle valve 22, and the duration and the lift of the intake valve 30 based on the calculated respective target values of the closing amount of the throttle valve 22, and of the duration and the lift of the intake valve 30.

According to the operation shown in FIG. 11 described above, the negative intake pipe pressure during acceleration is controlled so as to attain a target negative intake pipe pressure that appropriately takes the property of fuel supplied to the internal combustion engine 10 into consideration. Therefore, during cold acceleration, the amount of increase in fuel injection may be reduced irrespective of the evaporation characteristics of fuel, and also such a reduction in the amount of increase in fuel injection enables a further reduction in port wet amount. Further, when a fuel with relatively good evaporation characteristics is used, it is possible to prevent an excessive negative intake pipe pressure from being applied, thereby preventing a deterioration of fuel economy due to an increase in pump loss.

It should be noted that the ECU 40 in the fourth embodiment described above that executes the determination of the property of fuel supplied to the internal combustion engine 10 in step 400 may be regarded as the "fuel property determining section" of the present invention.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A control device of an internal combustion engine, comprising:
   a target negative pressure setting section that sets a target negative intake pipe pressure during cold acceleration to a negative intake pipe pressure larger than a negative intake pipe pressure prior to the cold acceleration;
   a throttle valve control section that controls a throttle valve so that the negative intake pipe pressure increases during cold acceleration; and
   an intake valve control section that controls a variable valve mechanism of an intake valve, based on the target negative intake pipe pressure, to obtain a target intake air amount.

2. The control device of an internal combustion engine according to claim 1, further comprising:
   a section that measures acceleration during cold acceleration, wherein the target negative pressure setting section sets the target negative intake pipe pressure when the acceleration is equal to or exceeds a predetermined acceleration.

3. The control device of an internal combustion engine according to claim 1, wherein the throttle valve control section controls the throttle valve to reduce a throttle opening amount relative to the throttle opening amount before cold acceleration.

4. The control device of an internal combustion engine according to claim 1, further comprising:
a determining section that determines whether cold acceleration is requested, wherein before cold acceleration is requested, if a throttle opening amount of the throttle valve is equal to or exceeds a predetermined throttle opening amount and the control of the variable valve mechanism is executed, the target negative pressure setting section sets a negative intake pipe pressure to the target negative intake pipe pressure during the cold acceleration.

5. The control device of an internal combustion engine according to claim 1, further comprising:
a section that measures a coolant temperature of the internal combustion engine, wherein the target negative pressure setting section sets the target negative intake pipe pressure based on the coolant temperature.

6. The control device of an internal combustion engine according to claim 5, wherein the target negative pressure setting section sets a lower target negative intake pipe pressure as the coolant temperature increases.

7. The control device of an internal combustion engine according to claim 1, wherein the intake valve control section controls at least one of a duration and a lift of the intake valve.

8. The control device of an internal combustion engine according to claim 7, wherein the intake valve control section increases the intake valve lift relative to the intake valve lift before cold acceleration.

9. The control device of an internal combustion engine according to claim 1, wherein:
the throttle valve control section reduces a throttle opening amount of the throttle valve relative to the throttle opening amount before cold acceleration; and
the intake valve control section controls at least one of a duration and a lift of the intake valve.

10. The control device of an internal combustion engine according to claim 1, wherein the target negative pressure setting section sets the target negative intake pipe pressure based on an operating speed of the variable valve mechanism during the cold acceleration.

11. The control device of an internal combustion engine according to claim 10, wherein the target negative pressure setting section sets the target negative intake pipe pressure, so that a difference between the negative intake pipe pressure before the cold acceleration and the target negative intake pipe pressure decreases, as the cold acceleration becomes greater.

12. The control device of an internal combustion engine according to claim 1, wherein the target negative pressure setting section sets the target negative intake pipe pressure based on an operating speed of the throttle valve during cold acceleration.

13. The control device of an internal combustion engine according to claim 12, wherein the target negative pressure setting section sets the target negative intake pipe pressure, so that a difference between the negative intake pipe pressure before the cold acceleration and the target negative intake pipe pressure decreases, as the cold acceleration becomes greater.

14. The control device of an internal combustion engine according to claim 1, further comprising:
a fuel property determining section that determines a property of fuel, wherein the target negative pressure setting section sets the target negative intake pipe pressure based on the determined property of fuel during the cold acceleration.

15. The control device of an internal combustion engine according to claim 14, wherein the target negative pressure setting section sets a higher target negative intake pipe pressure as an evaporation rate of the fuel decreases.

16. A method of controlling an internal combustion engine, comprising:
setting a target negative intake pipe pressure during cold acceleration to a negative intake pipe pressure that is greater than a negative intake pipe pressure prior to the cold acceleration;
controlling a throttle valve so that the negative intake pipe pressure increases during cold acceleration; and
controlling a variable valve mechanism of an intake valve, based on the target negative intake pipe pressure, to obtain a target intake air amount.

* * * * *